United States Patent
Osada

[19]

[11] Patent Number: 5,882,028
[45] Date of Patent: Mar. 16, 1999

[54] SHOCK ABSORPTIVE SUPPORT STRUCTURE

[75] Inventor: Yoo Osada, Kawagoe, Japan

[73] Assignee: Kakuwa Seiki Kabushiki Kaisha, Japan

[21] Appl. No.: 726,802

[22] Filed: Oct. 7, 1996

[30] Foreign Application Priority Data

Oct. 9, 1995 [JP] Japan .................................. 7-286320

[51] Int. Cl.⁶ .................................................. B62D 53/08
[52] U.S. Cl. ............................ 280/439; 280/440; 280/483
[58] Field of Search .................... 280/433, 437, 280/438.1, 439, 440, 441, 483, 484, 485; 267/141.2, 141.3, 141.4, 140.12, 293

[56] References Cited

U.S. PATENT DOCUMENTS

| | | | |
|---|---|---|---|
| 2,353,267 | 7/1944 | Reid ........................................ | 280/440 |
| 2,359,499 | 10/1944 | Walther et al. ........................ | 280/440 |
| 2,438,323 | 3/1948 | Miller . | |
| 2,507,616 | 5/1950 | Stephen . | |
| 2,513,117 | 6/1950 | Stephen .................................. | 280/44 |
| 2,778,657 | 1/1957 | Chaplin . | |
| 2,784,009 | 3/1957 | Braunberger ........................... | 280/440 |
| 2,856,203 | 10/1958 | Kayler ..................................... | 280/440 |
| 3,257,124 | 6/1966 | Mendez ................................... | 280/439 |

FOREIGN PATENT DOCUMENTS

| | | |
|---|---|---|
| 1290678 | 9/1962 | European Pat. Off. . |
| 592541 | 10/1977 | European Pat. Off. . |
| 60-195205 | 12/1985 | Japan . |

*Primary Examiner*—Peter C. English
*Assistant Examiner*—Gary Savitt
*Attorney, Agent, or Firm*—Finnegan, Henderson, Farabow, Garrett, & Dunner, L.L.P.

[57] ABSTRACT

A shock absorptive support structure in a coupler, improved in both economical efficiency and in practical usefulness, so that a shock due to relative displacement between a top plate and support brackets occurring in a vertical direction as well as in a back and forth direction can be effectively absorbed by the structure, driving comfort can be assured, wear of elastic members can be minimized, and a high measure of driving safety can be maintained for a long period of time with the structure of simplified construction enabling the manufacturing cost to be reduced. Shock absorbing members each include an inner cylinder, an outer cylinder and an elastic member disposed between these two cylinders and through which respective axle pins extend rotatably, and are tightly inserted into bearing holes of respective support brackets. The support brackets are then inserted between respective pairs of projections extending downward from a bottom of a top plate so as to leave a certain distance between tops of the respective support brackets and the bottom of the top plate. The the respective axle pins are fixed at their longitudinally opposite ends to the projections extending downward from the bottom of the top plate.

1 Claim, 5 Drawing Sheets

5,882,028

SHOCK ABSORPTIVE SUPPORT STRUCTURE

BACKGROUND OF THE INVENTION

1. Field of the Invention

The present invention relates to a shock absorptive support structure adapted for elastically supporting a top plate on support brackets in a coupler commonly referred to as a fifth wheel for coupling a tractor and a trailer.

2. Description of the Related Art

As a tractor coupled to a trailer is driven to travel in a direction, a relative displacement in the coupler inevitably occurs between the support bracket and the top plate in a direction corresponding substantially to the direction of travel and in a vertical direction. To solve this problem, the elastic support structure conventionally has been adopted so that the relative displacement between the support bracket and the top plate can be alleviated. For example, according to the disclosure of Japanese Utility Model Application Disclosure Gazette No. 1985-195205, the bottom of the top plate is provided with a downward extending projection to surround a space destined to receive a first elastic member having a concave bottom, while the upper end of the support bracket is provided with a boss having a convex top and a transverse through-hole. The boss is inserted tightly into the concave bottom of the first elastic member so that the top plate may be elastically supported on the support bracket. A support pin is inserted into the through-hole of the boss to fix it across the space defined by the projection extending downward from the bottom of the top plate and then a second elastic member is disposed between this support pin and the top of the boss.

The above-mentioned well known shock absorptive support structure satisfactorily functions in practice to assure safety as well as driving comfort as long as the support structure is relatively new. However, the same shock absorptive support structure is disadvantageous in that the elastic member is worn away after the coupler has been used for a relatively short period. Consequently, undesirable inter-metal contact or collision occurs between the top plate and the support bracket, generating abnormal noise as the tractor coupled to the trailer is driven. Shock caused by such inter-metal contact or collision is transmitted to the driver's seat and not only affects driving comfort but also causes breakage of parts of the support bracket, such as the boss, and eventually affects driving safety.

SUMMARY OF THE INVENTION

In view of the problems incurred by the shock absorptive support structure of the prior art, it is a principal object of the invention to provide a shock absorptive support structure in a coupler that is improved, not only in economical efficiency, but also, in practical use so that a shock resulting from vertical and back-and-forth relative displacement of the top plate and support brackets can be effectively absorbed by the structure, tractor driving comfort can be assured, wear or fatigue of elastic members can be minimized, and thereby a high measure of driving safety can be maintained for a long period of time, all with a simplified construction contributing to reduce the manufacturing cost.

The object set forth above is achieved, according to the invention, by a shock absorptive support structure comprising plural pairs of projections extending downward from the bottom of the top plate in parallel one to another, the support brackets each having a bearing hole, axle pins, and shock absorbing members so that each includes an inner cylinder, an outer cylinder and an elastic member disposed between these two cylinders. The shock absorptive support structure is further characterized in that the axle pins extend rotatably through the respective shock absorbing members which are, in turn, tightly received by the bearing holes of the respective support brackets then inserted between between the respective pairs of projections extending from the bottom of the top plate so as to leave a certain distance between tops of the respective support brackets and the bottom of the top plate. The axle pins are fixed at their longitudinally opposite ends to the projections of the top plate.

DESCRIPTION OF THE PREFERRED EMBODIMENTS

Details of the invention will be better understood from the following description of preferred embodiments made with reference to the accompanying drawings.

Figure 1:
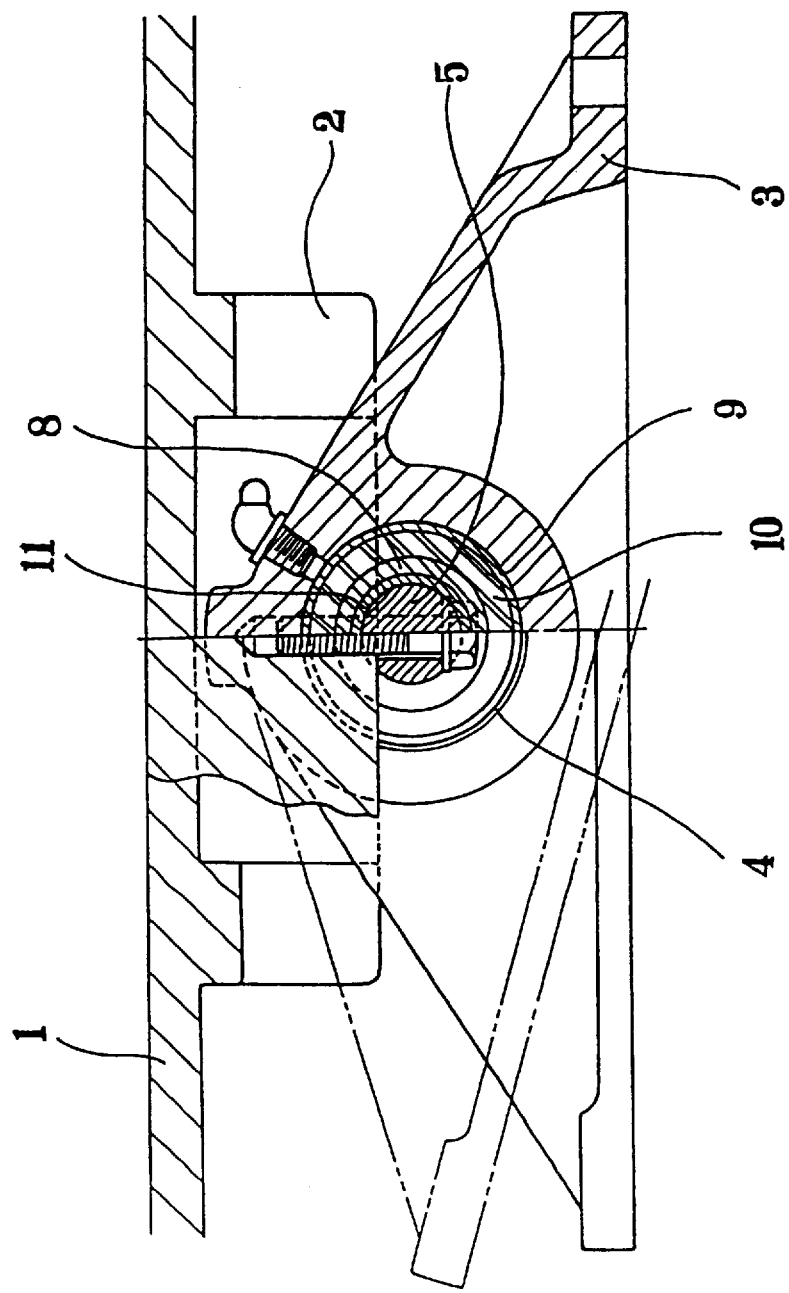
FIG. 1 is an enlarged fragmentary side view showing major parts in a preferred embodiment of the invention.
Figure 2:
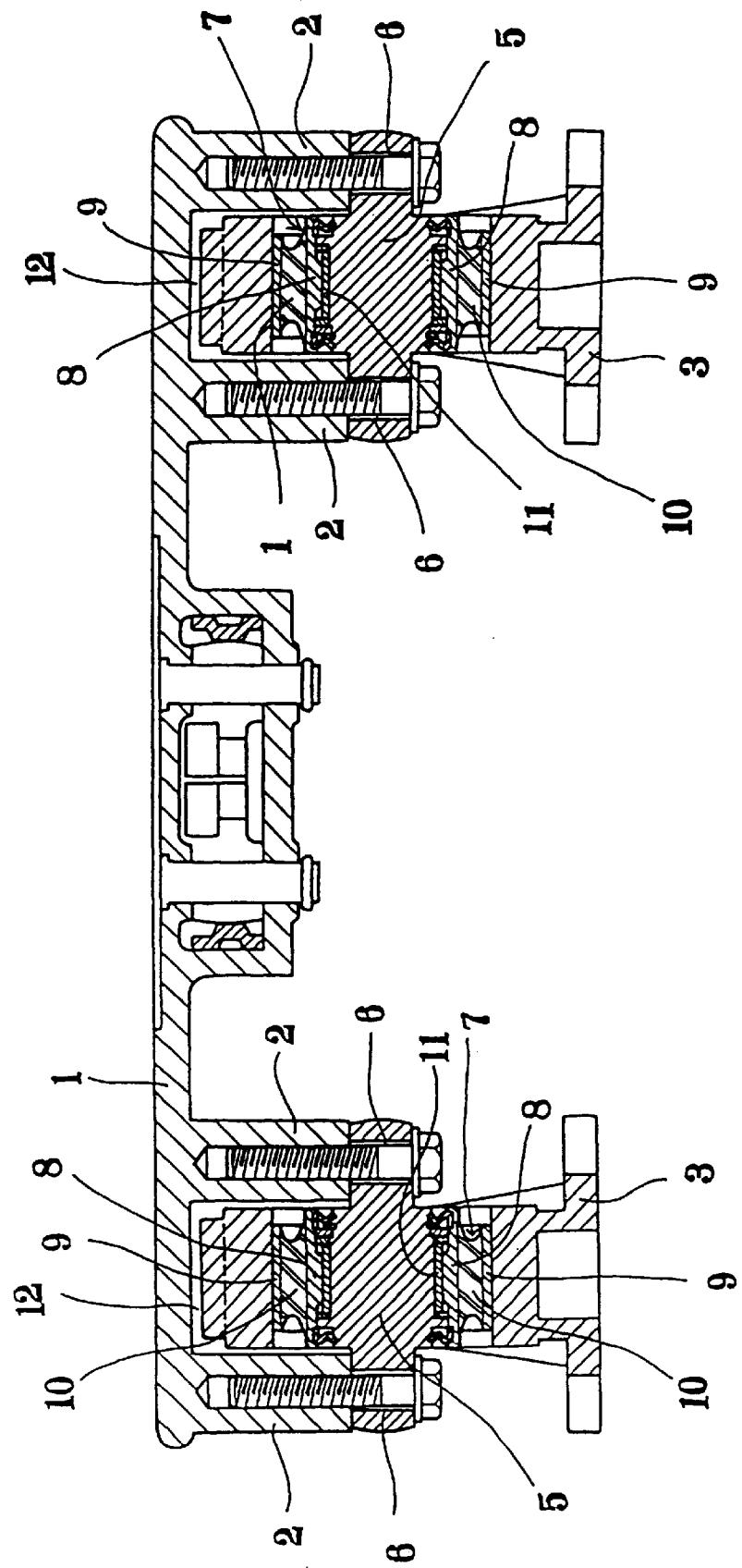
FIG. 2 is a sectional front view taken along axes of respective axle pins.

In FIGS. 1 and 2, reference numeral 1 designates a top plate of the inventive coupler, which includes two pairs of parallel projections extending downward similar to the top plate of the prior art.

With the top plate attached to a tractor, these two pairs of projections are positioned at opposite ends of the top plate transverse to the direction in which the tractor moves, as in the conventional top plate.

Reference numeral 3 designates support brackets which are similar to those conventionally attached to the tractor and formed centrally with bearing holes 4, respectively.

Reference numeral 5 designates axle-pins extending through respective shock absorbing members, as will be described later, in order to support the top plate on the support brackets 3. As will be best seen in FIG. 3, each of the axle pins 5 comprises a longitudinally intermediate cylindrical portion and longitudinally opposite end portions, each of which has radially opposite sides cut away so as to form planar surfaces. These end portions are formed with screw insertion holes 6, 6, respectively.

Reference numeral 7 designates the shock absorbing members, each comprising an inner cylinder 8, an outer cylinder 9 and an elastic member 10, for example, made of rubber and disposed between the inner and outer cylinders 8, 9. While in the shock absorbing member the inner cylinder 8, outer cylinder 9 and elastic member 10 are integrated, in so far as this specific embodiment is concerned, it should be understood that these components may be separately provided and then assembled into a unit.

Figure 3:
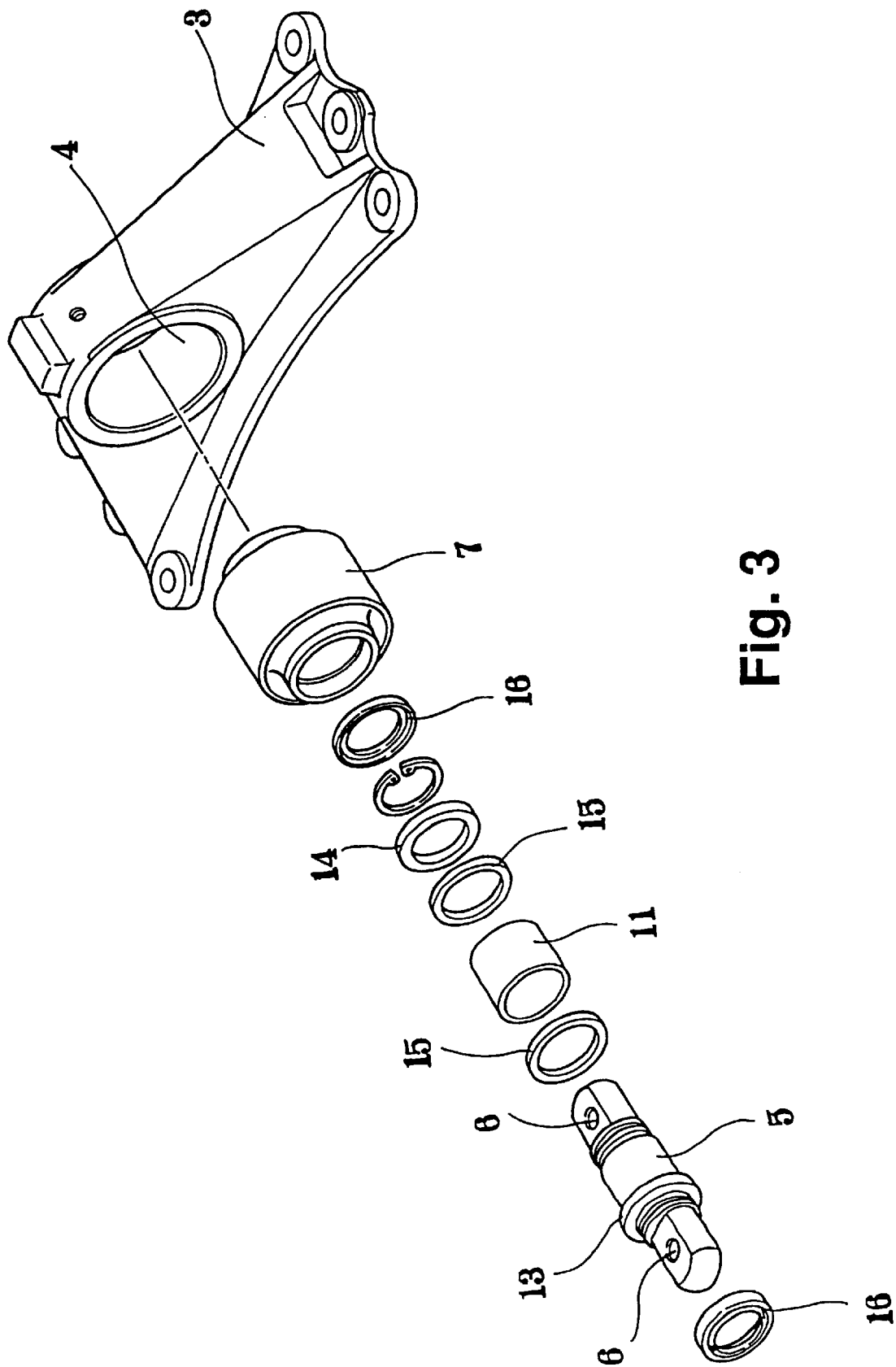
FIG. 3 is an exploded perspective view of the major parts.

While each of the axle pins 5 may extend rotatably through the inner cylinder 8 of the shock absorbing member 7, according to the inventive principle, the specific embodiment illustrated in FIGS. 1 through 3 employs a sleeve II disposed between the axle pin 5 and the inner cylinder 8.

The shock absorbing members 7 through which the axle pins 5 extend, respectively, are tightly engaged into the respective bearing holes 4 of the associated support brackets 3 so that the respective axle pins 5 may be received by the respective support brackets 3 rotatably as well as elastically.

The support brackets 3 assembled in this manner, with the axle pins 5 and the shock absorbing members 7, are inserted between the associated pairs of projections 2 of the top plate 1. Then the screws are inserted into the respective screw insertion holes 6, 6 formed adjacent the longitudinal opposite ends of the respective axle pins 5, as shown in FIG. 2, and these screws are threaded into the respective projections 2, 2 of the top plate 1 to support the top plate 1 on the support brackets 3.

It is very important to support the top plate 1 on the support brackets 3 so that a distance 12 is left between the tops of the respective support brackets 3 and the bottom of the top plate 1.

Reference numeral 13 designates a flange formed around the axle pin 5, reference numeral 14 designates a ring, reference numerals 15, 15 designate packings and reference numerals 16, 16 designate dust covers.

Figure 4:
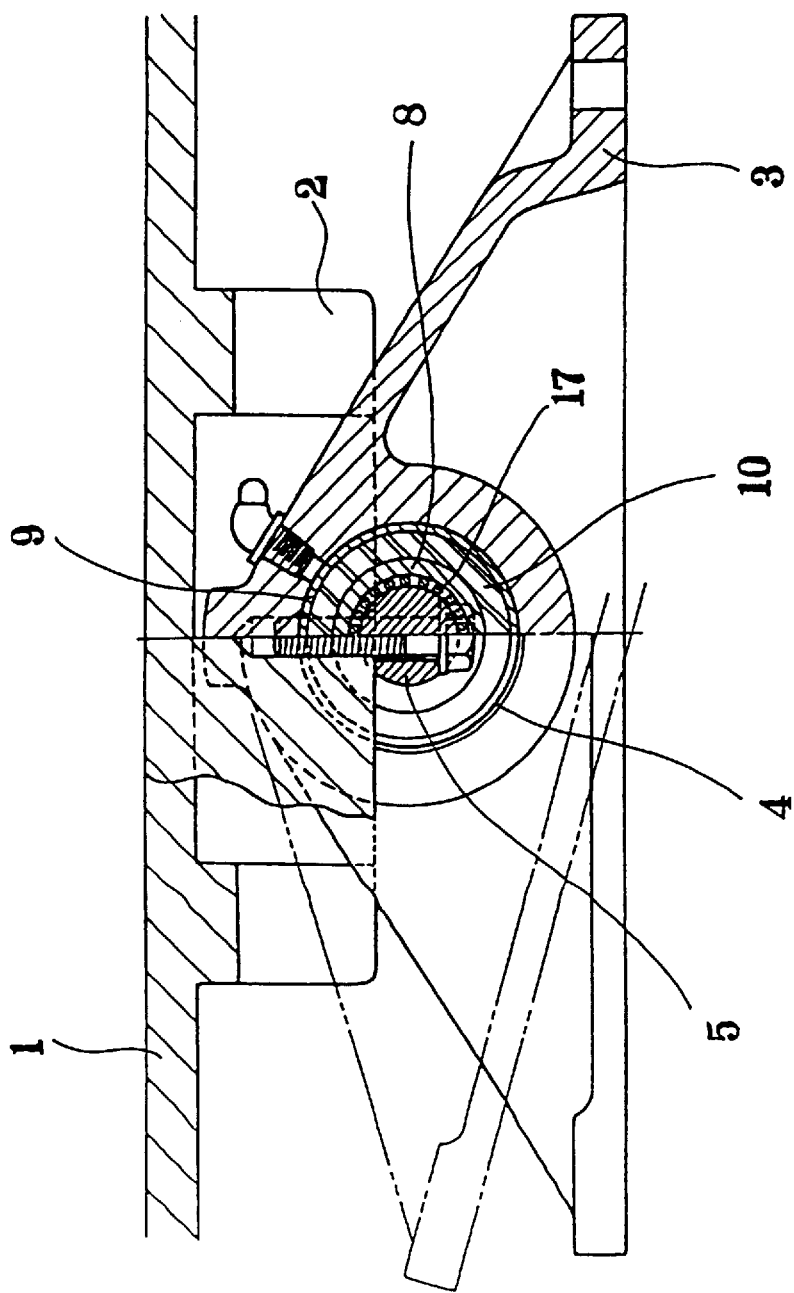
FIG. 4 is a view similar to FIG. 1 but showing major parts in an alternative embodiment of the invention.
Figure 5:
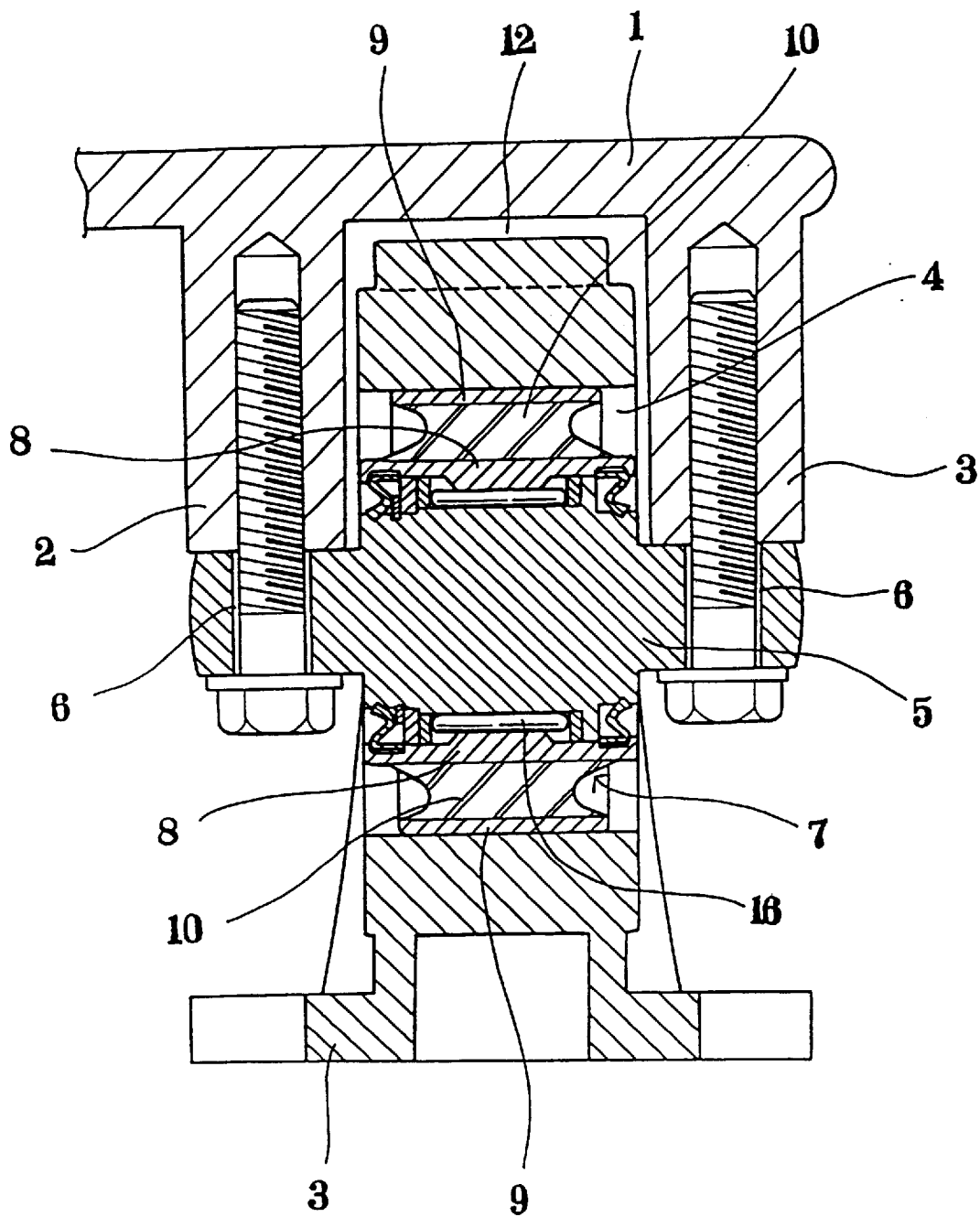
FIG. 5 is a view similar to FIG. 2 but showing the alternative embodiment.

FIGS. 4 and 5 show an alternative embodiment of the invention wherein parts similar to those identified in the embodiment of FIGS. 1 through 3 are designated by the same reference numerals. The embodiment shown in FIGS. 4 and 5 is similar to the embodiment previously described in reference with FIGS. 1 through 3, except that the sleeves 11 are replaced by respective bearings 16 in order to assure that the shock absorbing members 7 be rotatably supported by the respective axle pins 5.

With the inventive shock absorptive supporting structure in the coupler constructed as described hereinabove, the support brackets 3 are connected by the axle pins 5 and the shock absorbing members 7 to the top plate 1 so that any shock possibly occurring vertically and/or back-and-forth between the support brackets 3 and the top plate 1 may be effectively absorbed by the shock absorbing members 7. Additionally, no direct collision occurs between the tops of the respective support brackets 3 and the bottom of the top plate 1, since the appropriate distance is maintained between the tops of the respective support brackets 3 and the bottom of the top plate 1.

As will be apparent from the foregoing description, the shock absorptive supporting structure according to the invention is characterized by an unique construction in which the axle pin rotatably extends within the associated shock absorbing member. The shock absorbing member is engaged tightly with the axle extending therethrough into the bearing hole of the associated support bracket which, in turn, is inserted between the pair of projections extending downward from the bottom of the top plate and both ends of the axle pin are fixed to the pair of projections. As a result, an appropriate distance is left between the top of the support bracket and the bottom of the top plate pin, so that the elastic member, as a component of each shock absorbing member, can be protected between the inner and outer cylinders against wearing. In addition, any shock can be effectively and reliably absorbed by the shock absorptive supporting structure, thereby to maintain a high measure of driving safety for a long period of time. In addition, driving comfort can be enjoyed by the tractor driver, since he or she is free from any distracting noise and/or shock due to intermetallic contact or collision.

Furthermore, the shock absorptive supporting structure of the invention is of a simplified construction, which can be manufactured at a low cost and is extremely efficient in practical use, because it can be implemented merely by mounting the shock absorbing members, each comprising the inner cylinder, the outer cylinder and the elastic member disposed between these two cylinders, around the respective axle pins and then inserting these assemblies into the respective bearing holes formed in the respective support brackets.

What is claimed is:

1. A shock absorptive support structure for a coupler comprising:

a top plate having plural pairs of parallel projections extending downward from a bottom of said top plate;

support brackets each having a bearing hole, an axle pin, and a shock absorbing member comprising an inner cylinder, an outer cylinder, and an elastic member disposed between the inner and outer cylinders, said shock absorbing member being tightly received by said bearing hole of each said support bracket, said axle pin extending through the shock absorbing member and between each pair of the projections extending from the bottom of said top plate, said axle pins being fixed at longitudinally opposite ends to said projections of the top plate, wherein a sleeve or bearing is provided between said axle pin and said inner cylinder of each of said support brackets whereby said axle pins are freely rotatable relative to the respective shock absorbing member, and said respective support brackets are inserted between the respective pairs of projections so as to leave a certain distance between tops of the respective support brackets and the bottom of said top plate.

* * * * *